(12) United States Patent
Vaidya et al.

(10) Patent No.: US 10,650,383 B2
(45) Date of Patent: May 12, 2020

(54) METHOD AND SYSTEM FOR VERIFICATION AT POINT OF SALE

(71) Applicant: MasterCard International Incorporated, Purchase, NY (US)

(72) Inventors: Roopa Vaidya, Elmsford, NY (US); Michael Cardamone, New Windsor, NY (US); Cindi Pitz, Stormville, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 784 days.

(21) Appl. No.: 14/982,742

(22) Filed: Dec. 29, 2015

(65) Prior Publication Data

US 2017/0186005 A1 Jun. 29, 2017

(51) Int. Cl.
*G06Q 20/00* (2012.01)
*G06Q 20/40* (2012.01)
*G06Q 20/20* (2012.01)
*G06Q 20/22* (2012.01)

(52) U.S. Cl.
CPC ......... *G06Q 20/405* (2013.01); *G06Q 20/204* (2013.01); *G06Q 20/227* (2013.01)

(58) Field of Classification Search
None
See application file for complete search history.

(56) References Cited

U.S. PATENT DOCUMENTS

| 6,636,833 | B1 | 10/2003 | Flitcroft et al. | |
| 7,136,835 | B1 | 11/2006 | Flitcroft et al. | |
| 7,567,934 | B2 | 7/2009 | Flitcroft et al. | |
| 7,571,142 | B1 | 8/2009 | Flitcroft et al. | |
| 7,593,896 | B1 | 9/2009 | Flitcroft et al. | |
| 8,676,707 | B2 | 3/2014 | Flitcroft et al. | |
| 8,756,150 | B2 | 6/2014 | Flitcroft et al. | |
| 9,898,740 | B2 * | 2/2018 | Weller | G06Q 20/4016 |
| 2009/0070260 | A1 | 3/2009 | Flitcroft et al. | |
| 2012/0123882 | A1 * | 5/2012 | Carlson | G06Q 20/02 705/16 |
| 2013/0160098 | A1 * | 6/2013 | Carlson | G06F 21/45 726/6 |

(Continued)

*Primary Examiner* — Ariel J Yu
(74) *Attorney, Agent, or Firm* — Buchanan Ingersoll & Rooney PC

(57) ABSTRACT

A method for consumer verification of a payment transaction that exceeds previously established account limitations includes: storing account profiles, each including data related to a transaction account including a primary account number and transaction controls; receiving a transaction message related to a payment transaction including a specific primary account number, a point of sale identifier, and one or more additional data elements configured to store transaction details; identifying a specific account profile that includes the specific primary account number; determining that the payment transaction exceeds the account controls in the specific account profile based on the transaction details; transmitting question data for a plurality of questions to a point of sale associated with the point of sale identifier; receiving answer data from the point of sale; and transmitting the transaction message to a financial institution based on the answer data.

18 Claims, 8 Drawing Sheets

(56) References Cited

U.S. PATENT DOCUMENTS

2015/0356558 A1* 12/2015 Nuzum .................. G06Q 20/40
                                                    705/13
2016/0189151 A1*  6/2016 He ....................... G06O 20/401
                                                    705/75
2017/0171173 A1*  6/2017 Chandrasekaran ..........................
                                                    H04L 63/0492

* cited by examiner

METHOD AND SYSTEM FOR VERIFICATION AT POINT OF SALE

FIELD

The present disclosure relates to user verification at a point of sale, specifically the presentation of questions to a consumer at a point of sale device for consumer verification of a payment transaction when the transaction exceeds previously established account limitations.

BACKGROUND

For many consumers, keeping an eye on how their money is spent can often be a difficult task. As a result, a wide variety of methods have been developed to assist consumers with budgeting and spending. For instance, there are web sites and application programs designed to help a consumer decide how much money to spend in what type of purchase categories on a monthly basis. While such programs are often used purely for guidance, some financial institutions and other entities have developed methods for placing controls and limitations on a transaction account such that transactions that exceed the limitations are automatically denied.

However, this type of control may sometimes be too restrictive on a consumer. For example, a consumer may need to make an emergency purchase that would exceed account controls, but be unable to do so because of the restrictions on spending. In another example, a consumer may want to make a purchase on a special occasion that would otherwise exceed previously established account limits. Thus, there is a need for a technical solution to provide for the ability to authorize a transaction in certain circumstances despite the existence of account controls or limitations.

In some cases, account controls or limitations may be managed using a mobile communication device, which a consumer may have with them while shopping. In such instances, the consumer may manually adjust account controls or limits prior to conducting a transaction that would have exceeded prior limits. However, this process may be time consuming, the consumer may forget to adjust their controls or limits back to the prior value for future use, and may be unavailable if the consumer is not in possession of their mobile communication device or lacks a connection to a communication network. Thus, there is a need for a technical solution that also provides for consumer verification of the authorized transaction that can be performed at a point of sale device without the addition of added communication devices in the transaction system.

SUMMARY

The present disclosure provides a description of systems and methods for consumer verification of a payment transaction that exceeds previously established account limitations.

A method for consumer verification of a payment transaction that exceeds previously established account limitations includes: storing, in an account database of a processing server, a plurality of account profiles, wherein each account profile includes data related to a transaction account including at least a primary account number and one or more transaction controls; receiving, by a receiving device of the processing server, a transaction message related to a payment transaction via a payment network, wherein the transaction message is formatted based on one or more standards and includes a plurality of data elements including at least a first data element configured to store a specific primary account number, a second data element configured to store a point of sale identifier, and one or more additional data elements configured to store transaction details; executing, by a processing device of the processing server, a query on the account database to identify a specific account profile where the included primary account number corresponds to the specific primary account number stored in the first data element included in the received transaction message; determining, by the processing device of the processing server, that the payment transaction exceeds the one or more account controls included in the identified specific account profile based on the transaction details stored in the one or more additional data elements included in the received transaction message; electronically transmitting, by a transmitting device of the processing server, a data signal comprising question data for a plurality of questions associated with the payment transaction to a point of sale via a communication network, wherein the point of sale is associated with the point of sale identifier stored in the second data element included in the received transaction message; receiving, by the receiving device of the processing server, a data signal comprising answer data for a plurality of answers from the point of sale via the communication network; and electronically transmitting, by the transmitting device of the processing server, the received transaction message to a financial institution based on the answer data for the plurality of answers included in the received data signal.

A system for consumer verification of a payment transaction that exceeds previously established account limitations includes an account database, a receiving device, a processing device, and a transmitting device of a processing server. The account database of the processing server is configured to store a plurality of account profiles, wherein each account profile includes data related to a transaction account including at least a primary account number and one or more transaction controls. The receiving device of the processing server is configured to receive a transaction message related to a payment transaction via a payment network, wherein the transaction message is formatted based on one or more standards and includes a plurality of data elements including at least a first data element configured to store a specific primary account number, a second data element configured to store a point of sale identifier, and one or more additional data elements configured to store transaction details. The processing device of the processing server is configured to: execute a query on the account database to identify a specific account profile where the included primary account number corresponds to the specific primary account number stored in the first data element included in the received transaction message; and determine that the payment transaction exceeds the one or more account controls included in the identified specific account profile based on the transaction details stored in the one or more additional data elements included in the received transaction message. The transmitting device of the processing server is configured to electronically transmit a data signal comprising question data for a plurality of questions associated with the payment transaction to a point of sale via a communication network, wherein the point of sale is associated with the point of sale identifier stored in the second data element included in the received transaction message. The receiving device of the processing server is further configured to receive a data signal comprising answer data for a plurality of answers from the point of sale via the communication network. The transmitting device of the processing server is further configured to electronically transmit the received transaction message to a financial institution based on the answer data for the plurality of answers included in the received data signal.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
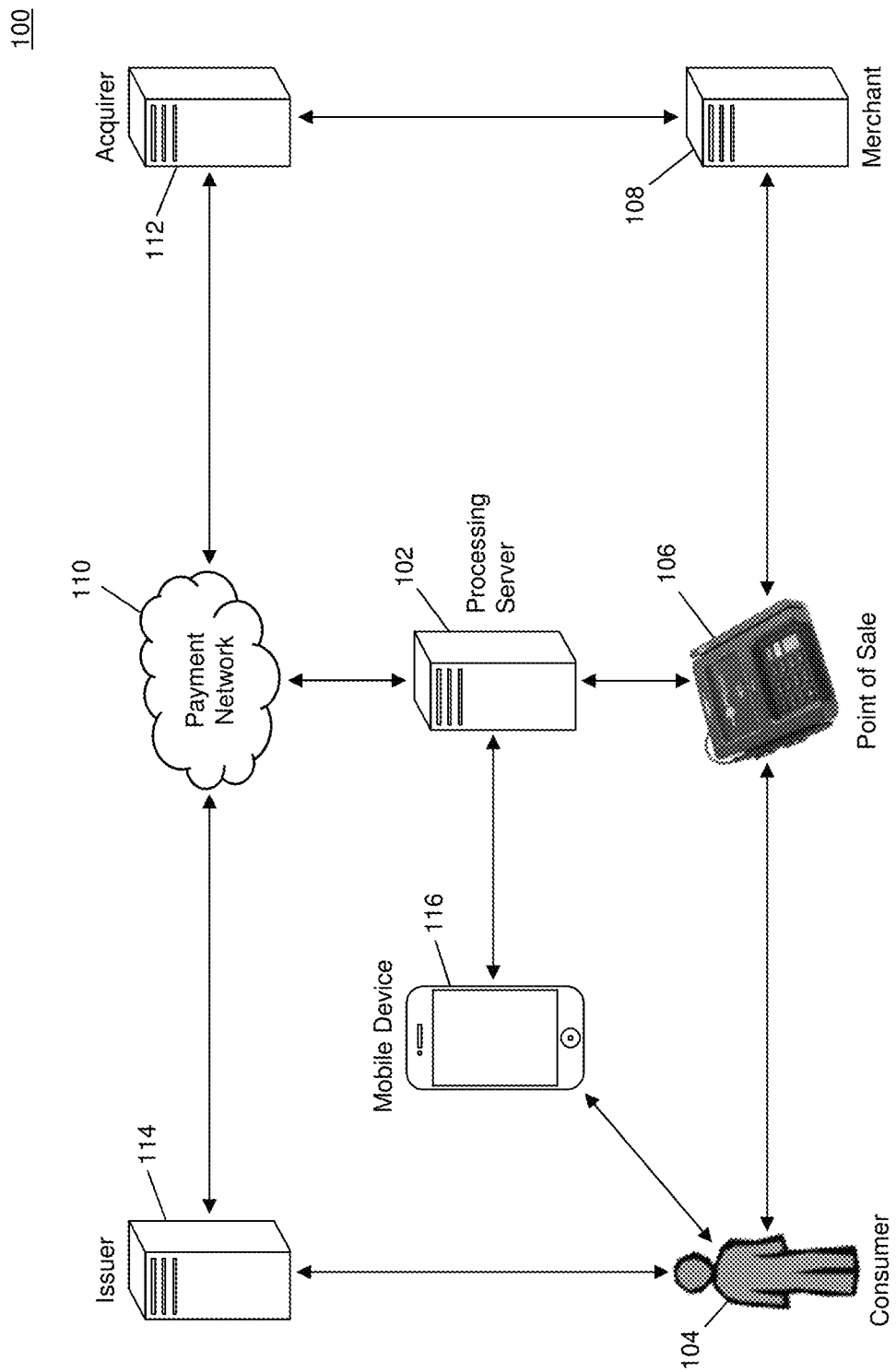
FIG. 1 is a block diagram illustrating a high level system architecture for user (e.g., consumer) verification of a payment transaction that exceeds previously established account limitations in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Consumer Verification of a Payment Transaction

FIG. 1 illustrates a system 100 for the consumer verification of a payment transaction that exceeds previously established account limitations at a point of sale via the answering of a supplied questionnaire.

The system 100 may include a processing server 102. The processing server 102, discussed in more detail below, may be a computing device or system of one or more computing devices configured to verify a payment transaction involving a consumer 104 that exceeds previously established account limitations. The consumer 104 may initiate a payment transaction via a point of sale device 106 of a merchant 108. The point of sale device 106 may be any type of computing device suitable for use as a point of sale that will be apparent to persons having skill in the relevant art. In some embodiments, the point of sale device 106 may be a physical computing device located at a physical location of the merchant 108. In other embodiments, the point of sale device 106 may be a computing system remotely accessed by the consumer 104 via a separate computing device, such as for a remote transaction. For example, if the transaction is conducted via the Internet, the consumer 104 may use a computing device to initiate a payment transaction with the point of sale device 106 of the merchant 108 via a website or application program.

The consumer 104 may present a payment card or other payment instrument to the point of sale device 106 for use in funding the payment transaction. The point of sale device 106 may receive payment details from the payment instrument using methods that will be apparent to persons having skill in the relevant art. For instance, the payment instrument may be a payment card that includes a magnetic stripe encoded with payment details, which may be read by a reading device of the point of sale device 106. In another example, the payment details may be stored on a mobile device 116, which may be any suitable type of mobile communication device, such as a cellular phone, smart phone, smart watch, wearable computing device, implantable computing device, etc., which may electronically transmit the payment details to the point of sale device 106 via near field communication. In yet another example, the consumer 104 may input payment details into a computing device that may electronically transmit the payment details to the point of sale device 106 via a communication network, such as the Internet.

The point of sale device 106 may receive the payment details from the consumer 104, and may also store additional transaction data for the payment transaction, which may be obtained using suitable methods. For instance, an employee of the merchant 108 may manually input products for purchase into an input device of the point of sale device 106, the point of sale device 106 may read product details from products, such as via the reading of machine-readable codes encoded with product details, etc. The point of sale device 106 may be configured to perform additional processing in order to obtain or otherwise identify the additional transaction data, such as by looking up prices for products, calculating a transaction amount, applying discounts, etc. The additional transaction data may include, for example, a transaction amount, transaction time and/or date, product data, merchant data, consumer data, offer data, reward data, loyalty data, etc.

The point of sale device 106 may electronically transmit the transaction data including the payment details to the systems of the merchant 108, which may forward the transaction data on to an acquirer 112. The acquirer 112 may be a financial institution, such as an acquiring bank, or other entity associated with the merchant 108 that owns, manages, or otherwise maintains a transaction account associated with the merchant 108 for use by the merchant 108 in conducting payment transactions. The transaction data may be electronically transmitted to the acquirer 112 via the payment rails, which may utilize one or more intermediate entities, such as a gateway processor. Additional detail regarding the processing of payment transactions and electronic transmission of transaction data for use thereof is discussed in more detail below with respect to the process 700 illustrated in FIG. 7.

The acquirer 112 may be configured to generate and submit a transaction message to a payment network 110 for processing of the payment transaction. The transaction message may be a data message formatted pursuant to one or more standards associated with the electronic transmission of data messages in financial payment transactions, such as the International Organization of Standardization's ISO 8583 standard. A transaction message may include a plurality of data elements configured to store data as set forth in the associated standard(s), including a data element configured to store a primary account number associated with a transaction account used to fund the payment transaction, a data element configured to store an identifier associated with the point of sale device 106 used to initiate the payment transaction, and additional data elements that may be configured to store additional data associated with the transaction, such as a transaction amount, transaction time and/or date, merchant data, product data, etc. In some instances, the transaction message submitted by the acquirer 112 may include a message type indicator indicative of the transaction message being an authorization request. The transaction message may also include one or more bitmaps, which may include data indicative of the data elements included in the transaction message and the data stored therein.

When the payment network 110 receives the transaction message, the payment network 110 may forward the transaction message to the processing server 102. In some embodiments, the processing server 102 may be a part of the payment network 110 and may receive the transaction message directly from the acquirer 112 via the payment rails or via internal communication of the payment network 110. In other embodiments, the payment network 110 may electronically transmit the transaction message to the processing server 102 via the payment rails or another suitable communication network.

The processing server 102 may be configured to apply one or more transaction controls to the payment transaction. Transaction controls may be controls or limitations applied to the usage of a transaction account, such that if the control or limitation is exceeded, the payment transaction is typically denied. Transaction controls may be set (e.g., added, identified, configured, etc.) by the consumer 104, such as via an application program executed by the mobile device 116, set by a financial institution associated with the transaction account used by the consumer 104 to fund the transaction, such as an issuer 114, which may be a financial institution (e.g., an issuing bank) or other entity associated with the transaction account, or other suitable entity. Transaction controls may include a control or limitation on a transaction amount for a single transaction, an aggregate transaction amount, a geographic location, merchant, merchant industry, product, product type, time, date, etc., or any combination thereof. For example, the consumer 104 may set a transaction control limiting spending to $500 per month at clothing retailers, as well as a $100 limit per transaction. Additional detail regarding transaction controls and application thereof to payment transactions may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

Application of the transaction controls may include the determination as to whether each of the account controls are satisfied by the payment transaction based on the controls, prior transaction history, if applicable, and the data stored in the data elements included in the received transaction message. If the account controls are satisfied, the processing server 102 may electronically transmit a notification to the payment network 110 indicating thusly. The payment network 110 may then forward the transaction message to the issuer 114 for processing, and may proceed with processing the payment transaction using traditional methods and systems. Additional detail regarding the processing of payment transactions via a payment network 110 is discussed in more detail below with respect to the process 700 illustrated in FIG. 7.

If the transaction controls are not satisfied, the processing server 102 may be configured to seek consumer verification of the payment transaction via the point of sale device 106. The processing server 102 may electronically transmit a data signal to the point of sale device 106 that is superimposed with a plurality of questions. The questions may be established by the processing server 102, payment network 110, issuer 114, or the consumer 104 themselves. For instance, the consumer 104 may established questions when creating an account control to be asked in instances when that account control is exceeded. For example, the consumer 104 may set a question that, if the account control of $500 at clothing retailers each month is exceeded, may ask, "Are you certain you want to spend this much on clothes this month?"

In some instances, questions may be specifically tailored to the payment transaction. For instance, if the transaction message includes product data identifying a product being purchased, one or more questions may include information associated with the product. For example, if the consumer 104 is attempting to buy a dress by fashion designer "P. Examiner," a question may ask, "Do you really need to go over budget for a dress by 'P. Examiner?'" In another example, one or more questions may be based on the merchant 108 involved in the transaction, the time, the date, the geographic location, or any other transaction data.

In some cases, questions may be "yes" or "no" questions. In other instances, questions may prompt a lengthier answer from the consumer 104. For example, the consumer 104 may be prompted to provide a reason for the purchase of a particular product, for the exceeding of the specific account control, etc. In some embodiments, one or more questions may be associated with authentication of the consumer 104, such as to ensure that the consumer 104 is authorized to use the transaction account used to fund the payment transaction. For example, the consumer 104 may be prompted to answer one or more security questions, such as by providing information that only the consumer 104 or another authorized person may be able to answer, such as a personal identification number, e-mail address, street address, phone number, pet's name, maiden name, birthplace, or other data that may be used in a security question as will be apparent to persons having skill in the relevant art.

The processing server 102 may identify the point of sale device 106 to electronically transmit the questions to the point of sale based on the point of sale identifier stored in the corresponding data element included in the received transaction message. The point of sale identifier may be a unique value associated with the point of sale device 106, such as an identification number, registration number, media access control address, internet protocol address, etc. In some instances, the processing server 102 may be configured to identify communication information for electronically transmitting the questions to the point of sale device 106 using the point of sale identifier, such as via a lookup table that corresponds point of sale identifiers to communication addresses. In some embodiments, the data signal superimposed with the questions may be electronically transmitted to the point of sale device 106 via the payment rails. In other embodiments, the data signal may be electronically transmitted using an alternative communication network, such as the Internet, a local area network, a radio frequency network, etc. In some cases, the data signal may be electronically transmitted to the acquirer 112, which may forward the data signal to the point of sale device 106 via the merchant 108 and any additional entities.

The point of sale device 106 may be configured to parse (e.g., deconstruct into data elements or values) the data signal to obtain the plurality of questions included therein. The point of sale device 106 may then present the questions to the consumer 104 via a display device. In embodiments where the consumer 104 is communicating with the point of sale device 106 remotely, such as in an e-commerce transaction, the point of sale device 106 may forward the questions to the computing device (e.g., the mobile device 116) used by the consumer 104, which may present the questions to the consumer 104 via a display device or other suitable output device. The consumer 104 may input answers to the questions via one or more input devices, such as a keyboard, mouse, click wheel, scroll wheel, touch screen, camera, microphone, etc. The point of sale device 106 may receive the answers, which may be input directly into the point of sale device 106 or into a separate computing device that electronically transmits the answers to the point of sale device 106. The point of sale device 106 may then electronically transmit a data signal superimposed with the answers to the processing server 102. In some instances, the data signal may be electronically transmitted directly to the processing server 102 via the payment rails or a suitable communication network. In other instances, the data signal may be electronically transmitted to the processing server 102 via the merchant 108, acquirer 112, payment network 110, and any other intermediate entity.

The processing server 102 may receive the data signal and may parse the data signal to obtain the answers superimposed thereon. In some instances, the data signal may also be superimposed with information identifying the payment transaction to which the answers correspond. For example, the processing server 102, payment network 110, or other system involved in the processing of the payment transaction may generate a unique identifier for association with the payment transaction, such as a transaction identification number. The unique identifier may be generated, for example, via generation of a random or pseudo-random number based on criteria (e.g., number of digits), via identification of the unique identifier from a set of unused unique identifiers, or other suitable method. The unique identifier may be transmitted to the point of sale device 106 with the plurality of questions, and may be returned by the point of sale device 106 with the answers. In such instances, the processing server 102 may associate the received and parsed answers with a transaction message using the unique identifier.

The processing server 102 may be configured to evaluate the answers to determine if the transaction is to be declined or to be forwarded to the issuer 114 for further processing. If one or more of the answers are answered in the negative (e.g., a "no" answer is provided to a "yes" or "no" question), then the processing server 102 may decline the transaction. The declining of the transaction may include the modification of the transaction message to include a response code in a corresponding data element indicating denial of the payment transaction. In some instances, a message type indicator may be modified to indicate that the transaction is an authorization response. The modified transaction message may then be electronically transmitted (e.g., via the payment network 110) to the acquirer 112 using the payment rails and the transaction finalized accordingly by the acquirer 112, merchant 108, and consumer 104. In some instances, a declined transaction may still be forwarded to the issuer 114 for processing. In such instances, the processing server 102 may modify the transaction message by including information in a data element indicating that the consumer 104 answered one or more questions in the negative, prior to forwarding the transaction message to the issuer 114 for processing. If the consumer 104 answers each question in the affirmative, the processing server 102 may proceed with processing the payment transaction using traditional methods, such as discussed in more detail below with respect to the process 700 illustrated in FIG. 7.

In some embodiments, the consumer 104, issuer 114, processing server 102, or other entity may be configured to set up a reward system for verification of payment transactions that exceed account controls. For example, the processing server 102 may be configured to automatically approve one transaction every six months that exceeds an account control if the consumer 104 does not approve a transaction that exceeds that account control during that time. In such embodiments, rewards may be used to encourage the consumer 104 to authorize fewer transactions that exceed account controls. In some cases, when a reward is satisfied (e.g., the consumer 104 has complied with the conditions of the reward), the plurality of questions presented to the consumer 104 if the associated account control(s) is exceeded may be modified. For instance, the consumer 104 may be asked if they would like to use the reward, asked if they would like to provide a reason as to why they have successfully satisfied the account control for the length of time, etc.

The methods and systems discussed herein enable the processing server 102 to provide for consumer verification of payment transactions that exceed account controls, without requiring modification of the underlying account controls. As a result, the consumer 104 may conduct an emergency payment transaction that would otherwise be prohibited, without having to first modify the account controls active on the transaction account, which would necessitate additional modification afterward to return the account controls, which may require a significant time commitment of the consumer 104, as well as ensure consumer access to a computing device and communication network capable of communication such requests. In addition, by utilizing the existing payment network, the processing server 102 may provide for these added benefits without requiring the consumer 102 to utilize a mobile device 116 or modify their existing transaction routine in any way, via improvements to the payment system and the point of sale device 106.

Processing Server

Figure 2:
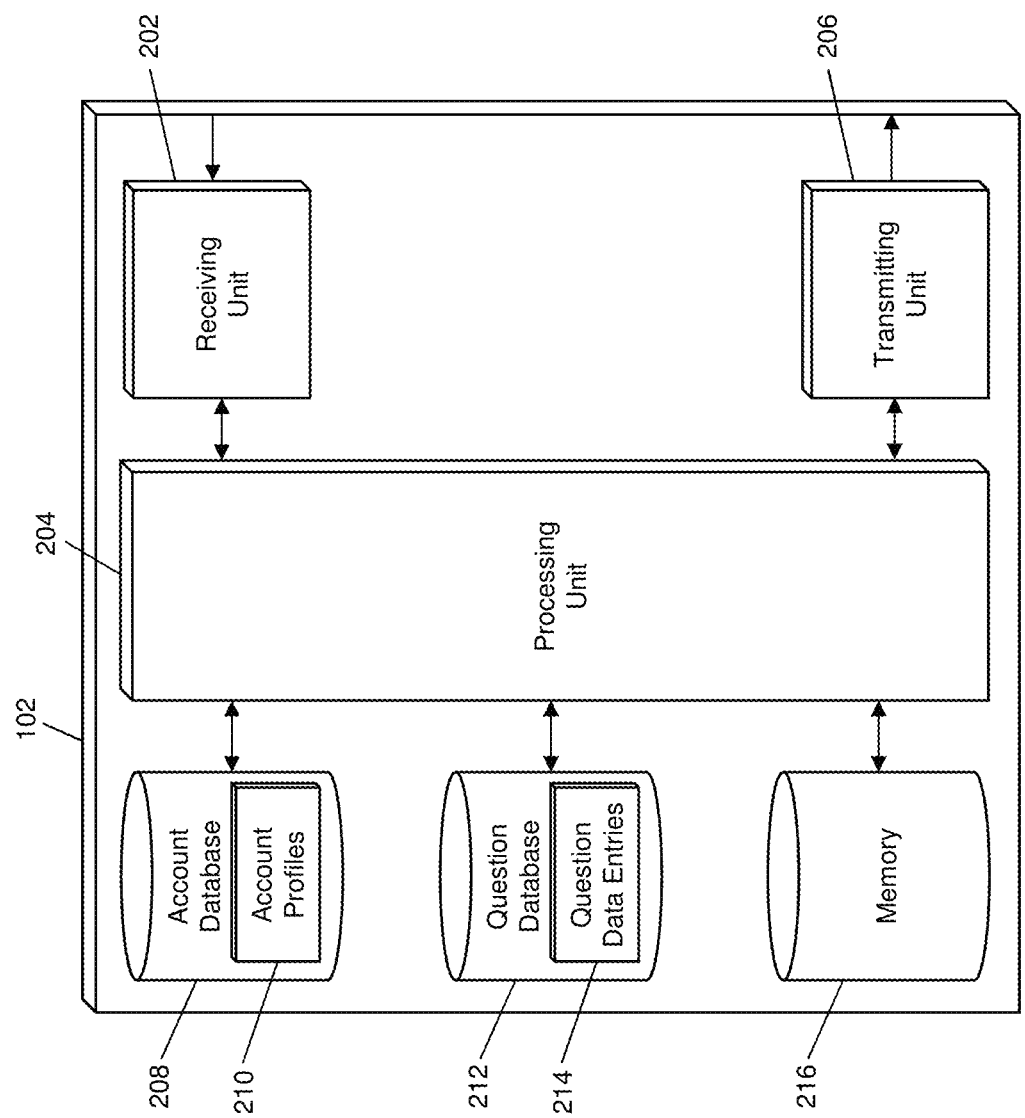
FIG. 2 is a block diagram illustrating the processing server of FIG. 1 for verifying a payment transaction that exceeds previously established account limitations based on consumer-supplied questionnaire answers at a point of sale device in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving unit 202. The receiving unit 202 may be configured to receive data over one or more networks via one or more network protocols. In some embodiments, the receiving unit 202 may be configured to receive data over the payment rails, such as using specially configured infrastructure associated with payment networks 104 for the transmission of transaction messages that include sensitive financial data and information. In some instances, the receiving unit 202 may also be configured to receive data from mobile devices 112, computing devices, issuers 108 and other entities via alternative networks, such as the Internet. In some embodiments, the receiving unit 202 may be comprised of multiple units, such as different receiving units for receiving data over different networks, such as a first receiving unit for receiving data over payment rails and a second receiving unit for receiving data over the Internet. The receiving unit 202 may receive electronically transmitted data signals, where data may be superimposed on the data signal and decoded, parsed, read, or otherwise obtained via receipt of the data signal by the receiving unit 202. In some instances, the receiving unit 202 may include a parsing module for parsing the received data signal to obtain the data superimposed thereon.

The receiving unit 202 may be configured to receive data signals electronically transmitted from the point of sale device 106, payment network 110, mobile device 116, etc. For instance, the receiving unit 202 may receive data signals electronically transmitted from the mobile device 116 superimposed with data associated with account controls, such as for the establishing, updating, and modification of account controls, the addition of questions, selection of question preferences, etc. The receiving unit 202 may receive data signals from the payment network 110 superimposed with transaction messages, which may be received via the payment rails or another suitable network. The receiving unit 202 may also receive data signals from the point of sale device 106 that are superimposed with answers provided by the consumer 104.

The processing server 102 may also include a processing unit 204. The processing unit 204 may be configured to perform the functions of the processing server 102 discussed herein as will be apparent to persons having skill in the relevant art. In some embodiments, the processing unit 204 may include and/or be comprised of a plurality of engines and/or modules specially configured to perform one or more functions of the processing unit 204. For example, the processing unit 204 may include a querying module configured to query databases included in the processing server 102 to identify information stored therein. In some instances, the processing unit 204 may include a parsing module or engine configured to parse data from data signals electronically received by the receiving unit 202, an encryption module or engine configured to decrypt received data or data signals or to encrypt data or data signals received or transmitted by the processing server 102, and any other modules suitable for performing the functions discussed herein.

The processing server 102 may further include an account database 208. The account database 208 may be configured to store a plurality of account profiles 210 using a suitable data storage format and schema. Each account profile 210 may be configured to store a structured data set of data related to a transaction account including at least a primary account number and one or more transaction controls. The primary account number may be an account number associate with the related transaction account that is used in the funding of payment transactions, such as may be stored in a corresponding data element of a transaction message for a payment transaction to be funded by the related transaction account. The one or more transaction controls may be controls that are to be applied to payment transaction for use in the approval or denial of payment transactions accordingly. In some instances, an account profile 210 may also include additional data suitable for the application of the controls, such as prior transaction history, aggregate transaction amounts, transaction statistics, etc. For example, the account profile 210 may include data regarding how much money is spent, at what merchants, on what days, etc., how often transactions occur, how many transactions have occurred in a specific time period, etc.

In some embodiments, an account profile 210 may also include questions. In such embodiments, the consumer 104 associated with the related transaction account may provide questions (e.g., via the mobile device 116) to be asked via the point of sale device 106 if one or more transaction controls are exceeded. In some instances, questions may be directly associated with one or more transaction controls. The account profile 210 may also include answer data for each question, such as indicating what may constitute an affirmative or negative answer for use in verification of a payment transaction. In some embodiments, the account profile 210 may include question preferences, such as preferences regarding number of questions, type of questions, the inclusion of product or merchant details in questions, the use of authentication questions, etc.

The processing server 102 may also include a question database 212. The question database 212 may be configured to store a plurality of question data entries 214 using a suitable data storage format and schema. Each question data entry 214 may be configured to store a standardized data set of data related to a question for consumer verification of a payment transaction including at least question data and answer data. The question data may include the related question, and may also include one or more attributes associated with the question, such as a question type (e.g., for authentication), data to be included in the question (e.g., for inclusion of transaction data), etc. The answer data may include one or more answer options, an indication of an affirmative and/or negative answer, and other suitable data.

The processing unit 204 may include a querying module. The querying module may receive input of a query to be executed on a database for the identification of data stored therein. The querying module may execute a query on the account database 208 to identify an account profile 210 for a transaction message that includes the primary account number included in the corresponding data element of the received transaction message. The output of the querying module may be the identified data, such as the identified account profile 210.

The processing unit 204 may also include a transaction control module. The transaction control module may be configured to apply transaction controls to a payment transaction to determine if the transaction controls are satisfied. The transaction control may receive the one or more transaction controls in the identified account profile 210 and any additional data related to the transaction controls as well as the transaction message as input, and may determine if the transaction controls are satisfied by the transaction based on the data stored in the data elements included in the transaction message. The transaction control module may output an indication of if the transaction controls are or are not satisfied. In some instances, the transaction control module may output an indication of any particular account controls that are not satisfied by the payment transaction.

In instances where a transaction control is not satisfied by a payment transaction, a question module of the processing unit 204 may be configured to identify questions for transmission to the point of sale device 106 to be presented to the consumer 104. In instances where the processing server 102 includes the question database 212, the querying module may execute a query to identify one or more question data entries 214. The question module may use the question data therein to generate questions. In instances where question data may be included in account profiles 210, the question module may be configured to generate questions from the question data included in the account profile 210 identified for the payment transaction.

The processing server 102 may further include a transmitting unit 206. The transmitting unit 206 may be configured to transmit data over one or more networks via one or more network protocols. In some embodiments, the transmitting unit 206 may be configured to transmit data over the payment rails, such as using specially configured infrastructure associated with payment networks 112 for the transmission of transaction messages that include sensitive financial data and information, such as identified payment credentials. In some instances, the transmitting unit 206 may be configured to transmit data to consumer devices 104, digital entities 106, third parties 108, merchants 110, and other entities via alternative networks, such as the Internet. In some embodiments, the transmitting unit 206 may be comprised of multiple units, such as different transmitting units for transmitting data over different networks, such as a first transmitting unit for transmitting data over the payment rails and a second transmitting unit for transmitting data over the Internet. The transmitting unit 206 may electronically transmit data signals that have data superimposed that may be parsed by a receiving computing device. In some instances, the transmitting unit 206 may include one or more modules for superimposing, encoding, or otherwise formatting data into data signals suitable for transmission.

The transmitting unit 206 may be configured to electronically transmit a data signal superimposed with the questions generated by the question module to the point of sale device 106. The electronic transmission may be transmitted to a destination address indicated by the point of sale identifier stored in the corresponding data element included in the transaction message. In some instances, the point of sale identifier may be the destination address. In other instances, the querying module may query a database to identify a destination address associated with the point of sale identifier based thereon. In some embodiments, the data signal electronically transmitted to the point of sale device 106 may also be superimposed with data indicating the transaction message to which the questions correspond. The data may be, for instance, a transaction identifier, which may be stored in a corresponding data element included in the transaction message or generated by the processing unit 204, such as by a identifier generation module included therein.

The processing unit 204 may further include an answer evaluation module. The answer evaluation module may be configured to evaluate answers parsed from a data signal received by the receiving unit 202 from the point of sale device 106 that includes answer data. The answer evaluation module may output an indication of positive or negative answers with respect to the associated questions. In some instances, the answer evaluation module may identify the questions to which the answers correspond based on a transaction identifier accompanying the answers in the data signal. The result of the evaluation module may be output to a transaction processing module of the processing unit 204, which may process the transaction accordingly.

If the answers provided by the consumer 104 are indicated as being positive answers, then the transaction may be processed using usual methods and systems. For instance, the transaction processing module may instruct the transmitting unit 206 to electronically transmit the transaction message to the issuer 114 associated with the transaction account used to fund the payment transaction via the payment rails. If the answers provided by the consumer 104 are indicated as being negative answers, the transaction processing module may instruct the transmitting unit 206 to electronically transmit the transaction message to the acquirer 112 that provided the transaction message via the payment rails. In some instances, the transaction processing module may first modify the transaction message by modifying the message type indicator to be indicative of an authorization response and including a response code in a corresponding data element that indicates denial of the payment transaction.

The processing server 102 may also include a memory 216. The memory 216 may be configured to store data for use by the processing server 102 in performing the functions discussed herein. The memory 216 may be configured to store data using suitable data formatting methods and schema and may be any suitable type of memory, such as read-only memory, random access memory, etc. The memory 216 may include, for example, encryption keys and algorithms, communication protocols and standards, data formatting standards and protocols, program code for modules and application programs of the processing unit 204, and other data that may be suitable for use by the processing server 102 in the performance of the functions disclosed herein as will be apparent to persons having skill in the relevant art.

Process for Pre-Transaction Consumer Verification

Figure 3:
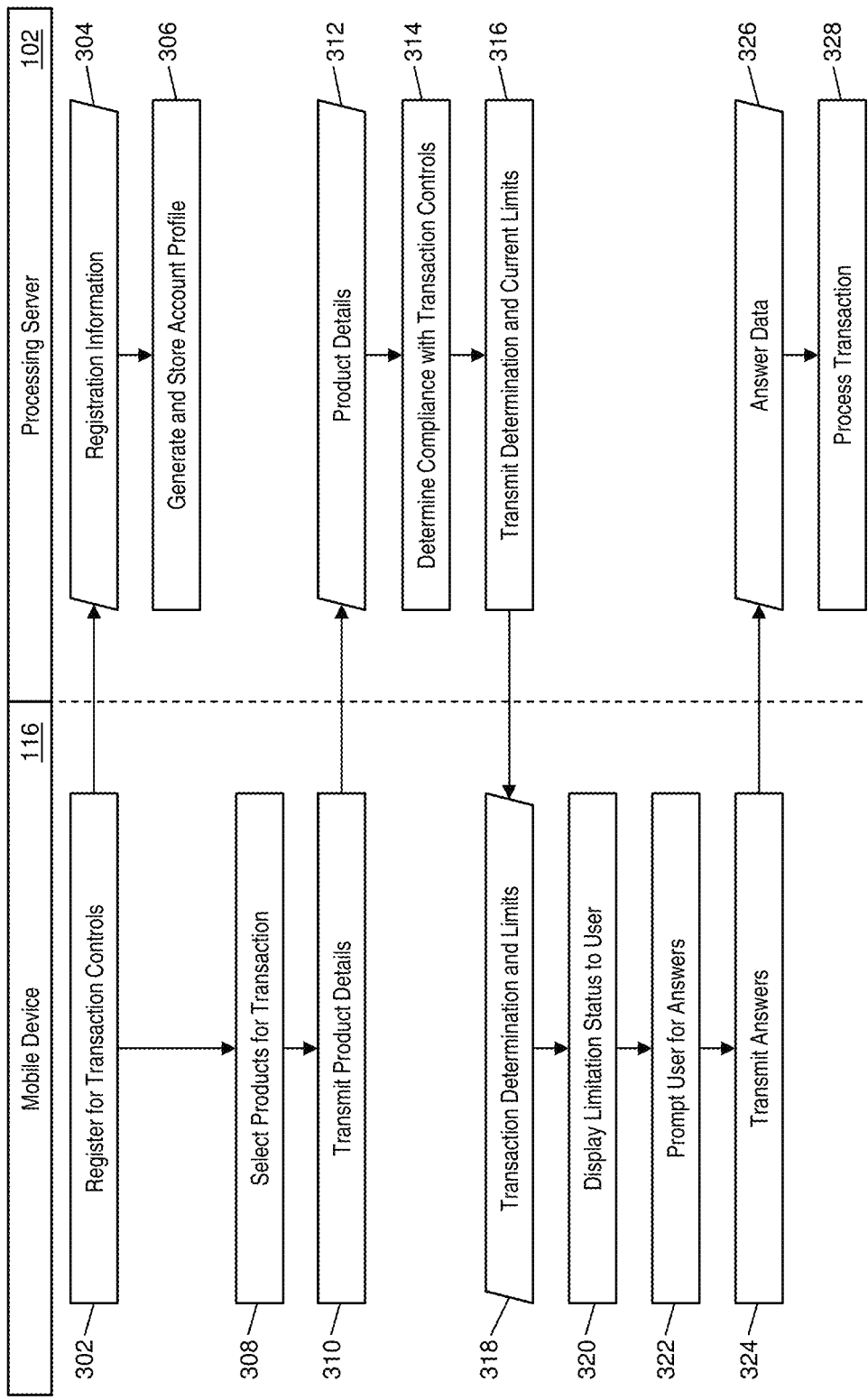
FIG. 3 is a flow diagram illustrating a process for consumer verification of products for purchase that exceed previously established account limitations prior to initiation of a payment transaction in accordance with exemplary embodiments.

FIG. 3 illustrates a process 300 for the consumer verification of a payment transaction as part of the system 100 of FIG. 1 for verification of the transaction prior to processing, for a transaction that will exceed one or more transaction controls.

In step 302, the consumer 104 may use the mobile device 116 to register transaction controls for a transaction account with the processing server 102. The registration may include the input of transaction controls by the consumer 104 using an input device of the mobile device 116. The transaction controls may be selected using an application program, such as an application program directly associated with transaction control management or a web browsing application program configured to display a web page associated with management of transaction controls. The mobile device 116 may electronically transmit a data signal comprised with the transaction control selections of the consumer 104 and an primary account number to the processing server 102 using a suitable communication network, such as a cellular communication network or the Internet.

In step 304, the receiving unit 202 of the processing server 102 may receive the data signal superimposed with the registration information, which may include the primary account number and one or more transaction controls, and may parse the data signal to obtain the superimposed information. In some embodiments, the receiving unit 202 may receive the data signal via an application programming interface of the processing server 102 and/or the mobile device 116 or an application program executed thereby. In step 306, the processing unit 204 may generate an account profile 210 and store the account profile 210 in the account database 208 of the processing server 102. The account profile 210 may include the primary account number and one or more transaction controls included in the parsed registration information.

In step 308, the consumer 104 may use the mobile device 116 to select one or more products for purchase in a payment transaction. The consumer 104 may select the products via a web page (e.g., as displayed by a web browsing application program executed by the mobile device 116) or an application program executed by the mobile device 116 that may be installed in the mobile device 116 (e.g., as program code in a memory of the mobile device 116) or access remotely via the mobile device 116, such as using cloud computing techniques. The selection of products for purchase via a web page and application program may include, for example, the adding of products into a shopping cart or other repository for review and purchase by the consumer 104.

In step 310, product details for the selected products may be transmitted from the mobile device 116 to the processing server 102. In some embodiments, the mobile device 116 may electronically transmit a data signal superimposed with the product details directly to the processing server 102. In other embodiments, the mobile device 116 may initiate the transmitting of product details from a separate computing device (e.g., associated with the merchant 108 with whom the products have been selected) to the processing server 102 via electronic transmission of a data signal. In step 312, the receiving unit 202 of the processing server 102 may receive the data signal superimposed with the product details. The product details may include at least a primary account number associated with the transaction account to be used by the consumer 104 for the transaction and a purchase amount for each product, and may include any additional information that may be suitable for use in determining compliance with transaction controls, such as a merchant name, merchant industry, geographic location, time and/or date, product category, etc.

In step 314, the processing unit 204 may determine compliance of the product details with one or more transaction controls to which the proposed payment transaction is subject. As part of the determination, the querying module of the processing unit 204 may execute a query on the account database 208 to identify an account profile 210 that includes the primary account number included in the product details. The transaction control module of the processing unit 204 may apply the one or more transaction controls and other associated data stored in the identified account profile 210 to the product details to determine if the one or more transaction controls are satisfied by the product details.

In step 316, the transmitting unit 206 of the processing server may electronically transmit a data signal to the mobile device 116 using a suitable communication network that is superimposed with the determination of the transaction control module. The data signal may also be superimposed with any transaction controls associated with the proposed payment transaction, such as to indicate to the consumer 104 what controls may be exceeded and what controls are applicable that may not be exceeded. In step 318, the mobile device 116 may receive the data signal and parse the data signal to obtain the data superimposed thereon. In step 320, the mobile device 116 may display the determination of compliance with the transaction controls and the applicable limits of the transaction controls to the consumer 104 via a display device. The consumer 104 may then decide to proceed with the transaction or adjust the products being purchased based on the applicable transaction controls. For example, if the determination indicates that a control is not satisfied, the consumer 104 may know to either remove one or more products from the selection, or to be ready to answer questions to provide verification of the transaction at the point of sale device 106. In such instances, the transaction may then be initiated and completed, without being in violation of any of the applicable transaction controls.

In some embodiments, the method may also include additional steps 322 through 328, where the consumer 104 may be able to provide additional verification for the transaction prior to the processing of the payment transaction. For example, in step 322, the consumer 104 may be prompted to input answers to their questions, which may have been electronically transmitted to the mobile device 116 with the transaction determination and limits. The consumer 104 may input their answers using the mobile device 116. Then, in step 324, the mobile device 116 may electronically transmit the answers to the processing server 102 via a suitable communication network. In step 326, the receiving unit of the processing server 102 may receive the answer data. In step 328, the processing server 102 may initiate processing of the payment transaction.

As discussed below, the processing may include the evaluation of the answers provided by the consumer 104, which may be based on the answers, the corresponding questions, and answer data that may be available for each question, as applicable. If the answers are incorrect, the processing server 102 may electronically transmit a notification to the mobile device 116 indicating thusly, and the consumer 104 may elect to modify their products to meet the transaction limits or re-submit answers (e.g., which may be subject to limits, such as a limited number of answer attempts). If the answers provided by the consumer 104 are correct, then the product details may be forwarded by the transmitting unit 206 of the processing server 102 to the merchant point of sale 106 or the transaction data forwarded directly to the payment network 110 (e.g., in a transaction message) for direct processing of the payment transaction. In such embodiments, the consumer 104 may pre-authorize the payment transaction by providing the answers to the verification question before the transaction is initiated, via the method illustrated in FIG. 3 and discussed above. In other instances, the early notification to the consumer 104 (e.g., prior to the initiation of the payment transaction) of non-compliance with transaction controls may enable the consumer 104 to adjust their purchase to meet the controls.

Process for Consumer Verification of a Payment Transaction

Figure 4:
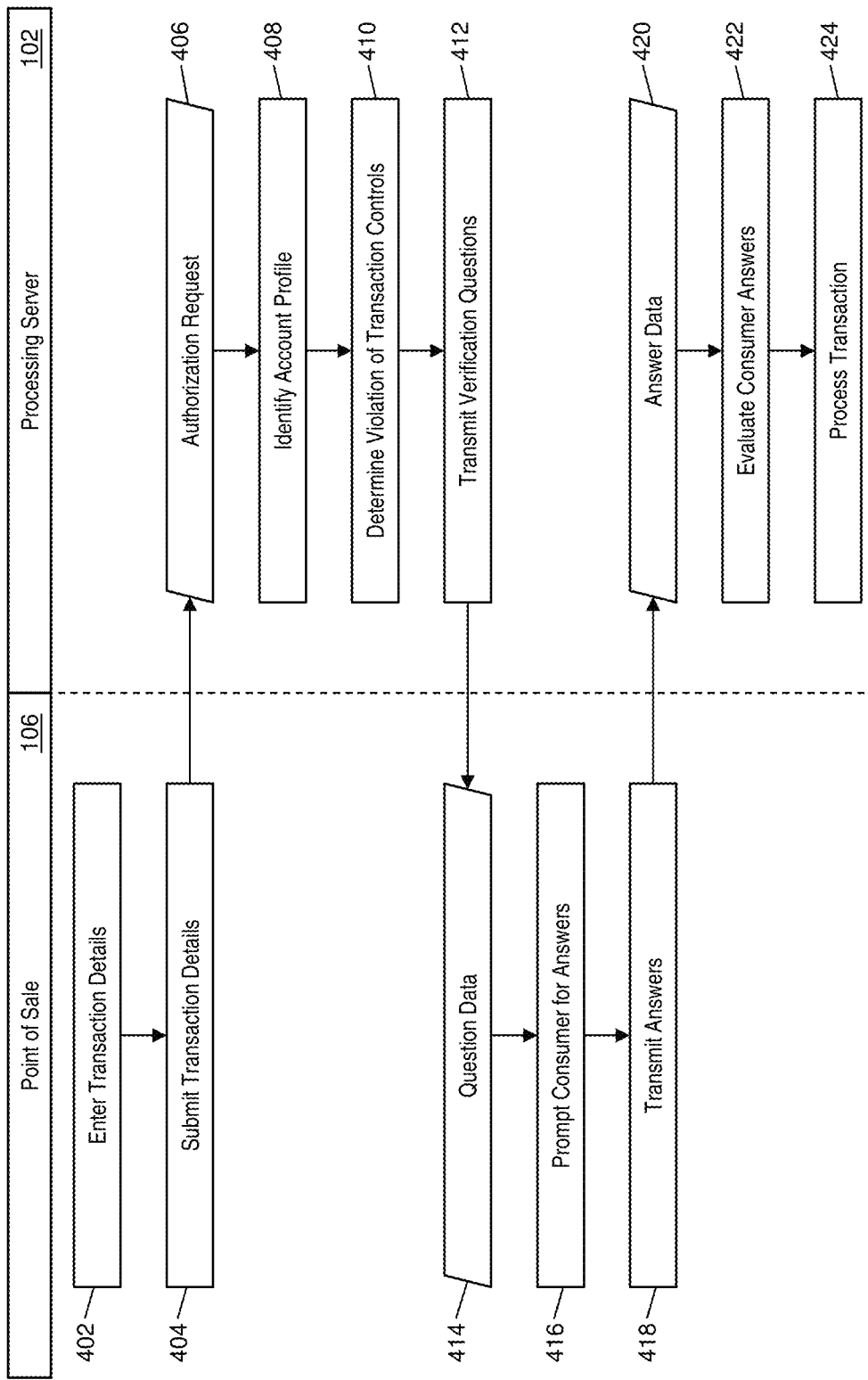
FIG. 4 is a flow diagram illustrating a process consumer verification of a payment transaction that exceeds previously established account limitations at a point of sale in accordance with exemplary embodiments.

FIG. 4 illustrates a process 400 for the verification of a payment transaction that exceeds one or more transaction controls by the consumer 104 at the point of sale device 106 in the system 100.

In step 402, transaction details may be entered into the point of sale device 106 for a payment transaction. The transaction details may include payment details associated with a method of payment presented by the consumer 104 to fund the transaction, including at least a primary account number, and additional data regarding the payment transaction, such as a transaction amount, transaction time and/or date, geographic location, product data, merchant data, consumer data, loyalty data, reward data, offer data, etc. In step 404, the point of sale device 106 may submit the transaction details for processing of the related payment transaction to the processing server 102. The submission may be to an entity, such as a gateway processor or acquirer 114, that may forward the transaction details to the payment network 110 and processing server 102 using traditional methods, such as discussed in more detail below.

In step 406, the receiving unit 202 of the processing server 102 may receive an authorization request for the payment transaction from the payment network 110. The authorization request may be a transaction message formatted pursuant to one or more standards that includes a plurality of data elements configured to store data for the related payment transaction including at least a first data element configured to store a primary account number and one or more additional elements configured to store additional transaction data. The transaction message may also include a message type indicator indicating that the transaction message is an authorization request.

In step 408, the querying module of the processing unit 204 of the processing server 102 may execute a query on the account database 208 to identify an account profile 210 related to the payment transaction where the included primary account number corresponds to the primary account number stored in the first data element included in the received transaction message. In step 410, the transaction control module of the processing unit 204 may apply the one or more transaction controls included in the identified account profile 210 to the transaction data stored in the one or more additional data elements of the transaction message and may determine that the payment transaction is in violation of at least one of the transaction controls.

In step 412, verification questions may be transmitted to the point of sale device 106 by the transmitting unit 206 of the processing server 102 as a result of the violation. The querying module of the processing unit 204 may query the question database 212 to identify a plurality of question data entries 214 related to questions to present for the payment transaction. The question data entries 214 may be identified based on transaction data for the payment transaction included in the transaction message, preferences of the consumer 104 as included in the identified account profile 210, or other suitable method. In some instances, the question module of the processing unit 204 may generate questions based on question data included in the identified question data entries 214 or identified account profile 210, as well as data stored in the additional data elements of the transaction message. The verification questions may be superimposed in a data signal that is electronically transmitted by the transmitting unit 206 of the processing server 102 to the point of sale device 106, such as via the payment rails, an alternative communication network, or via one or more third party entities, such as the acquirer 112. In some embodiments, the data signal may also be superimposed with a transaction identifier.

In step 414, the point of sale device 106 may receive the data signal and may parse the data signal to deconstruct the signal and obtain the questions superimposed thereon. In step 416, the point of sale device 106 may display the questions on a display device and prompt the consumer 104 to provide answers to the questions. The answers may be input to the point of sale device 106 by one or more input devices, and then, in step 418, electronically transmitted as superimposed in a data signal to the processing server 102 via the payment rails, alternative communication network, or one or more third party entities.

In step 420, the receiving unit 202 of the processing server 102 may receive and parse the data signal to obtain the answers to the questions. In some embodiments, the answer data received from the point of sale device 106 may also include a transaction identifier associated with the payment transaction. In step 422, the answer evaluation module of the processing unit 204 may evaluate the answers provided by the consumer 104. The evaluation may be based on the answers, the corresponding questions, and answer data that may be available for each question, as applicable. In step 424, the transaction processing module of the processing unit 204 may process the payment transaction accordingly. For example, if the answer evaluation module indicates positive answers, the transaction message may be forwarded to the issuer 114 associated with the transaction account used to fund the transaction for further processing. If the answer evaluation module indicates negative answers, the payment transaction may be denied and the transaction message returned to the acquirer 112.

Process for Consumer Verification of a Payment Transaction with Rewards

Figure 5:
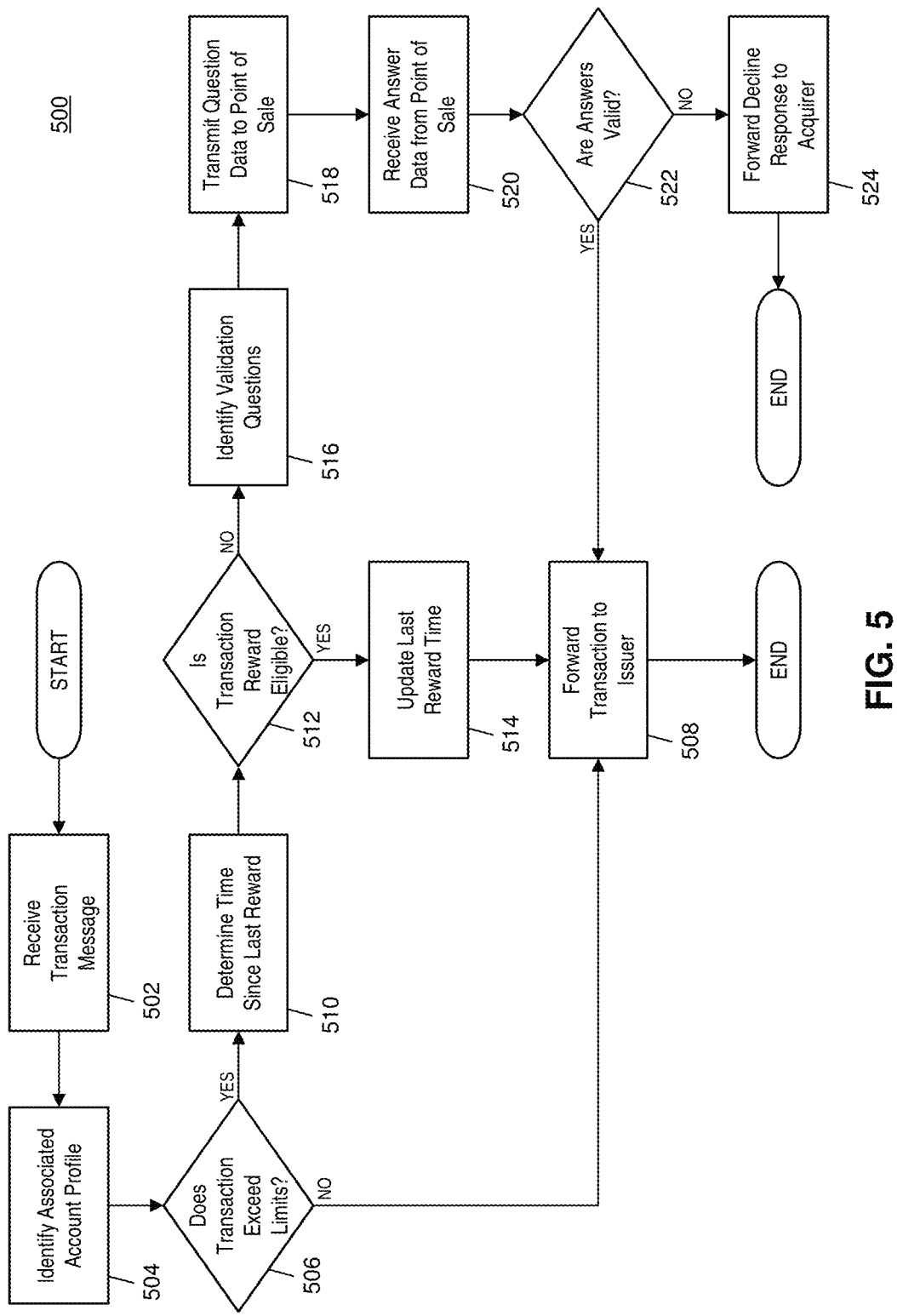
FIG. 5 is a flow diagram illustrating a process for verification of a payment transaction that exceeds previously established account limitations using the processing server of FIG. 2 in accordance with exemplary embodiments.

FIG. 5 illustrates a process 500 for the verification of a payment transaction that exceeds transaction controls that is also subject to reward verification as performed by the processing server 102.

In step 502, the receiving unit 202 of the processing server 102 may receive a transaction message. The transaction message may be electronically transmitted via the payment rails and may be formatted pursuant to one or more standards, such as the ISO 8583 standard, and include a plurality of data elements including at least a first data element configured to store a primary account number and one or more additional data elements configured to store transaction data. Transaction data may include, for example, a transaction amount, transaction time and/or date, geographic location, merchant data, consumer data, offer data, loyalty data, reward data, etc. In some instances, the transaction message may include a message type indicator indicative of being an authorization request.

In step 504, the querying module of the processing unit 204 of the processing server 102 may execute a query on the account database 208 to identify an account profile 210 related to a transaction account associated with the payment transaction. The identified account profile 210 may include a primary account number that corresponds to the primary account number stored in the first data element included in the received transaction message. In step 506, the processing unit 204 may determine if the payment transaction exceeds account limits for the related transaction account. The determination may be based on the results of the transaction control module of the processing unit 204, which may apply the one or more transaction controls and associated data in the identified account profile 210 to the transaction data stored in the one or more additional data elements of the transaction message.

If the transaction does not exceed any of the transaction controls of the identified account profile 210, then, in step 508, the transmitting unit 206 of the processing server 102 may electronically transmit the transaction message to the issuer 114 associated with the related transaction account via the payment rails. The issuer 114 may be identified based on data included in the identified account profile 210, such as the primary account number, which may include a bank identification number associated with the issuer 114.

If the transaction does exceed one or more of the transaction controls, then, in step 510, the processing unit 204 may determine how much time has elapsed since the last time a transaction that exceeded transaction controls was authorized due to a reward. The determination may be based on a time stored in the identified account profile 210 and a transaction time and/or date, which may be stored in a corresponding data element included in the received transaction message, or identified by an appropriate module of the processing unit 204. In step 512, the processing unit 204 may determine if the transaction is eligible for a reward. The eligibility may be based on the determined time since last reward, a reward time that may be associated with the transaction account as included in the identified account profile 210, and other criteria, such as preferences of the consumer 104 or the issuer 114 that may be stored in the account profile 210 or other suitable location.

If the transaction is eligible for automatic verification as a reward, then, in step 514, the processing unit 204 may update the time associated with reward usage in the identified account profile 210 to the time of the payment transaction. Then, the process 500 may proceed to step 508 where the transaction message is electronically transmitted to the issuer 114 for processing. If the transaction is not eligible, then, in step 516, the question module of the processing unit 204 may generate questions to present to the consumer 104. The questions may be generated based on question data included in the identified account profile 210 or one or more question data entries 214 in a question database 212 of the processing server 102 (e.g., identified via the querying module), and may be further based on transaction data stored in the one or more additional data elements included in the received transaction message. In step 518, the transmitting unit 206 of the processing server 102 may electronically transmit a data signal superimposed with the questions to the point of sale device 106 via the payment rails, alternative communication network, or one or more third party entities.

In step 520, the receiving unit 202 may receive a data signal superimposed with answer data from the point of sale device 106. A parsing module of the receiving unit 202 or processing unit 204 may parse the data signal to obtain the answers superimposed thereon. In step 522, the answer evaluation module of the processing unit 204 may evaluate the answers to the questions to determine if the answers are valid. The answers may be valid if they are determined to be positive answers to the questions, such as may be defined in answer data associated with the question data used to generate the questions. If the answers are determined to be valid, then the process 500 may proceed to step 508 where the transaction message is forwarded to the issuer 112. If the answers are determined to be invalid, then, in step 524, the transaction processing module of the processing unit 204 may modify the transaction message to indicate that the transaction was declined, such as by including a response code in the corresponding data element that indicates denial of the transaction, and the transmitting unit 206 may transmit the modified transaction message to the acquirer 112.

Figure 6:
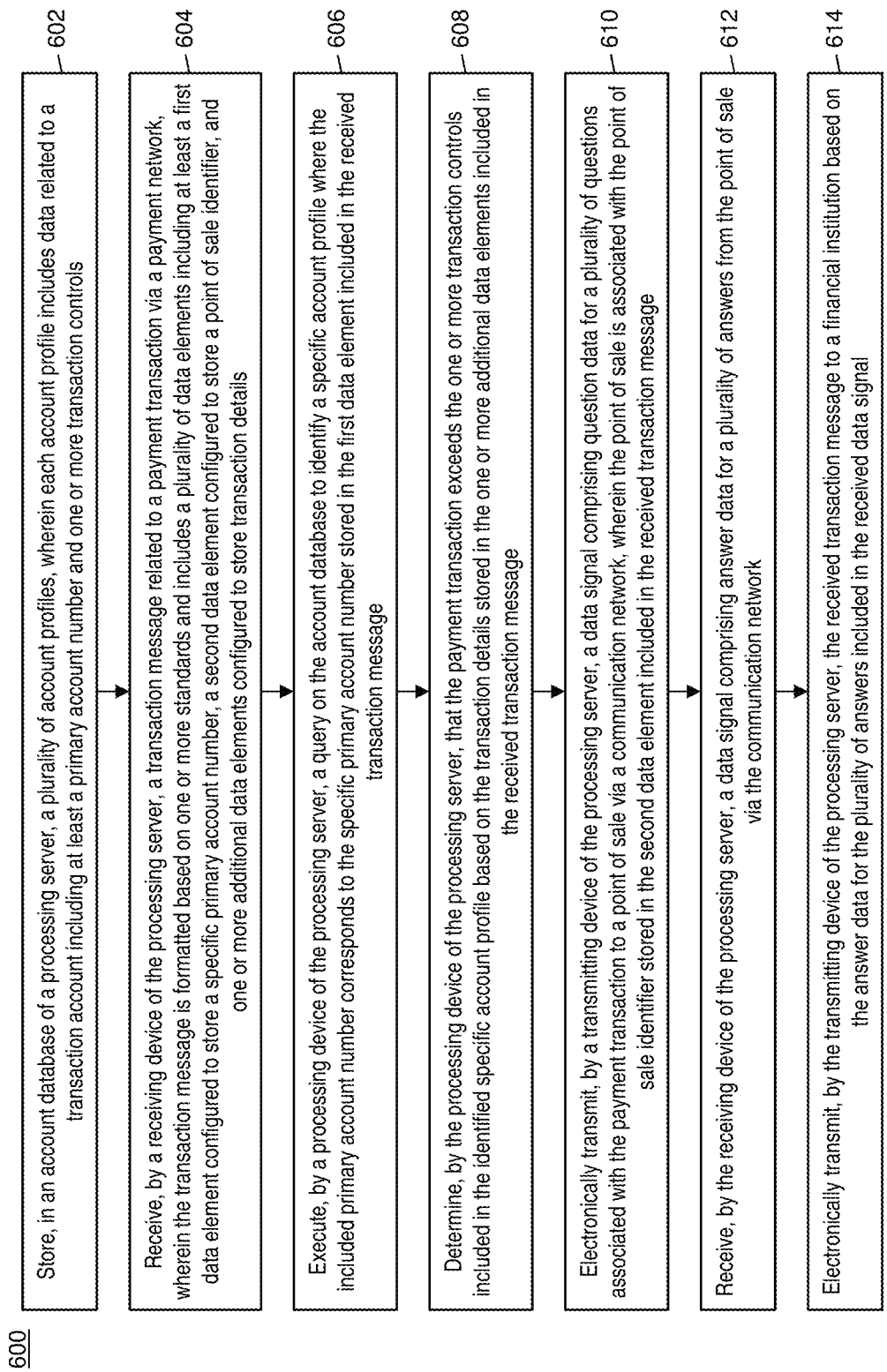
FIG. 6 is a flow chart illustrating an exemplary method for consumer verification of a payment transaction that exceeds previously established account limitations in accordance with exemplary embodiments.

Exemplary Method for Consumer Verification of a Payment Transaction that Exceeds Previously Established Account Limitations FIG. 6 illustrates a method 600 for the verification of a payment transaction by a consumer at a point of sale when the payment transaction exceeds previously established account limitations.

In step 602, a plurality of account profiles (e.g., account profiles 210) may be stored in an account database (e.g., the account database 208) of a processing server (e.g., the processing server 102), wherein each account profile includes data related to a transaction account including at least a primary account number and one or more transaction controls. In step 604, a transaction message related to a payment transaction may be received by a receiving device (e.g., the receiving unit 202) of the processing server via a payment network (e.g., the payment network 110), wherein the transaction message is formatted based on one or more standards and includes a plurality of data elements including at least a first data element configured to store a specific primary account number, a second data element configured to store a point of sale identifier, and one or more additional data elements configured to store transaction details.

In step 606, a query may be executed by a processing device (e.g., the processing unit 204) of the processing server on the account database to identify a specific account profile where the included primary account number corresponds to the specific primary account number stored in the first data element included in the received transaction message. In step 608, the processing device of the processing server may determine that the payment transaction exceeds the one or more account controls included in the identified specific account profile based on the transaction details stored in the one or more additional data elements included in the received transaction message.

In step 610, a data signal comprising question data for a plurality of questions associated with the payment transaction may be electronically transmitted by a transmitting device (e.g., the transmitting unit 206) of the processing server to a point of sale via a communication network, wherein the point of sale is associated with the point of sale identifier stored in the second data element included in the received transaction message. In step 612, a data signal comprising answer data for a plurality of answers may be received by the receiving device of the processing server from the point of sale via the communication network. In step 613, the received transaction message may be transmitted by the transmitting device of the processing server to a financial institution based on the answer data for the plurality of answers included in the received data signal.

In one embodiment, the method 600 may further include determining, by the processing device of the processing server, the answer data for the plurality of answers included in the received data signal to indicate correct answers to the plurality of questions, wherein the received transaction message is transmitted to an issuing financial institution associated with the transaction account related to the identified specific account profile In some embodiments, the method 600 may also include determining, by the processing device of the processing server, the answer data for the plurality of answers included in the received data signal to indicate incorrect answers to the plurality of questions, wherein the transaction message is received from an acquiring financial institution associated with a merchant involved in the payment transaction, and the received transaction message is transmitted to the acquiring financial institution.

In one embodiment, the question data for the plurality of questions may be based on at least the transaction details stored in the one or more additional data elements included in the received transaction message. In some embodiments, each account profile of the plurality of account profiles may further include question data and answer data, and the question data for the plurality of questions may correspond to the question data stored in the identified specific account profile. In one embodiment, the method 600 may further include storing, in a question database (e.g., the question database 212) of the processing server, a plurality of question data entries (e.g., question data entries 214), wherein each question data entry includes data related to a question including at least question data and answer data, wherein each account profile of the plurality of account profiles further includes data indicating a plurality of question data entries, and the question data for the plurality of questions comprises question data included in the plurality of question data entries indicated in the identified specific account profile.

In some embodiments, each account profile of the plurality of account profiles may further include transaction history, the transaction history indicating at least a reward date, and one of the one or more additional data elements may be configured to store a transaction date. In a further embodiment, the method 600 may further include determining, by the processing device of the processing server, a time period between the transaction date included in the received transaction message and the reward date indicated in the transaction history included in the identified specific account profile exceeds a predetermined period of time. In an even further embodiment, the transaction message may be received from an acquiring financial institution associated with a merchant involved in the payment transaction, and the received transaction message may be transmitted to an issuing financial institution associated with the transaction account related to the identified specific account profile.

Payment Transaction Processing System and Process

Figure 7:
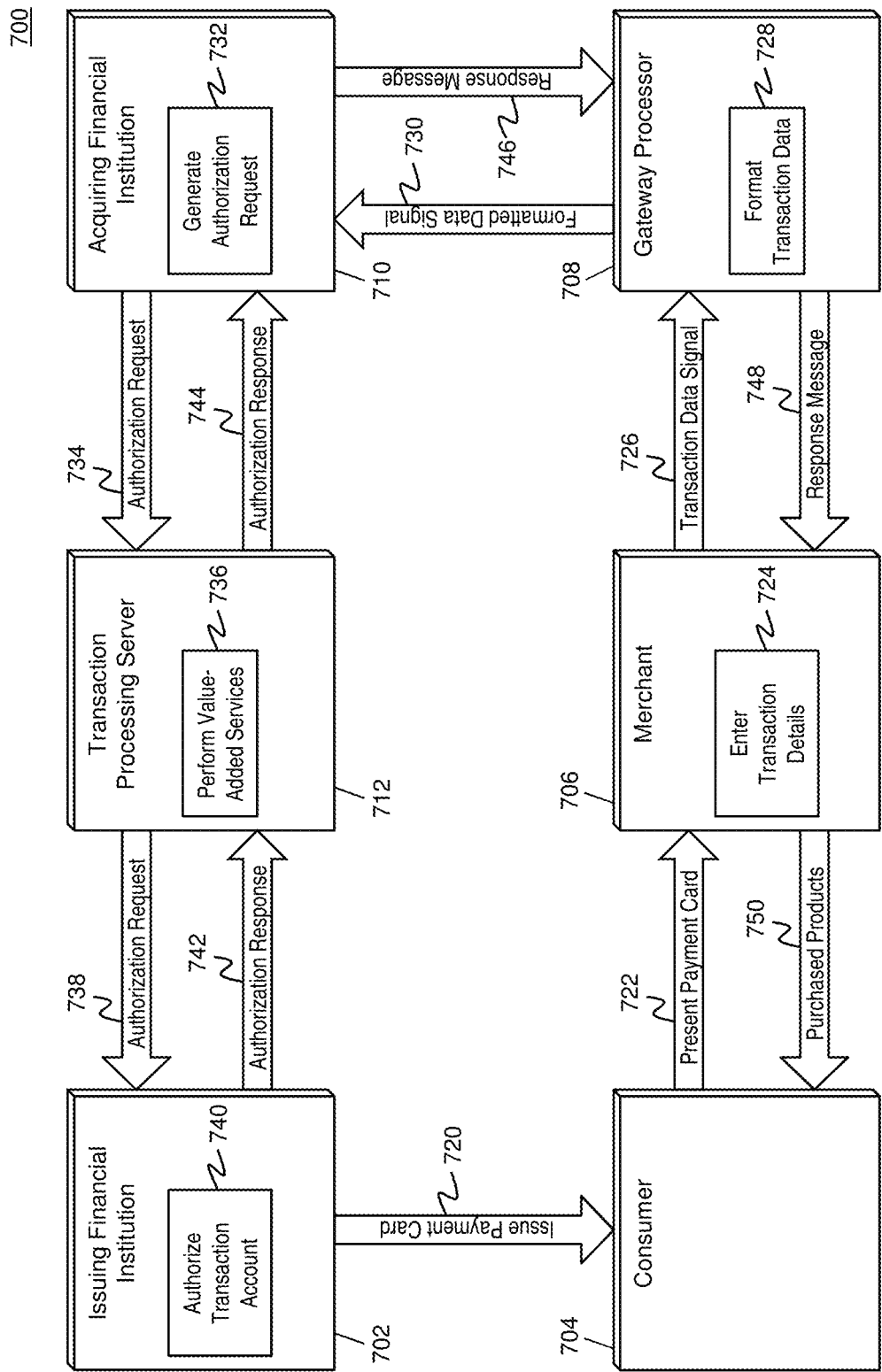
FIG. 7 is a flow diagram illustrating the processing of a payment transaction in accordance with exemplary embodiments.

FIG. 7 illustrates a transaction processing system and a process 700 for the processing of payment transactions in the system. The process 700 and steps included therein may be performed by one or more components of the system 100 discussed above, such as the consumer 104, point of sale device 106, merchant 108, acquirer 112, issuer 114, processing server 102, and payment network 110. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3-6, discussed above, with respect to the step or steps involved in the processing of a payment transaction. In addition, the entities discussed herein for performing the process 700 may include one or more computing devices or systems configured to perform the functions discussed below. For instance, the merchant 704 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 508 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 740 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 770, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 702. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
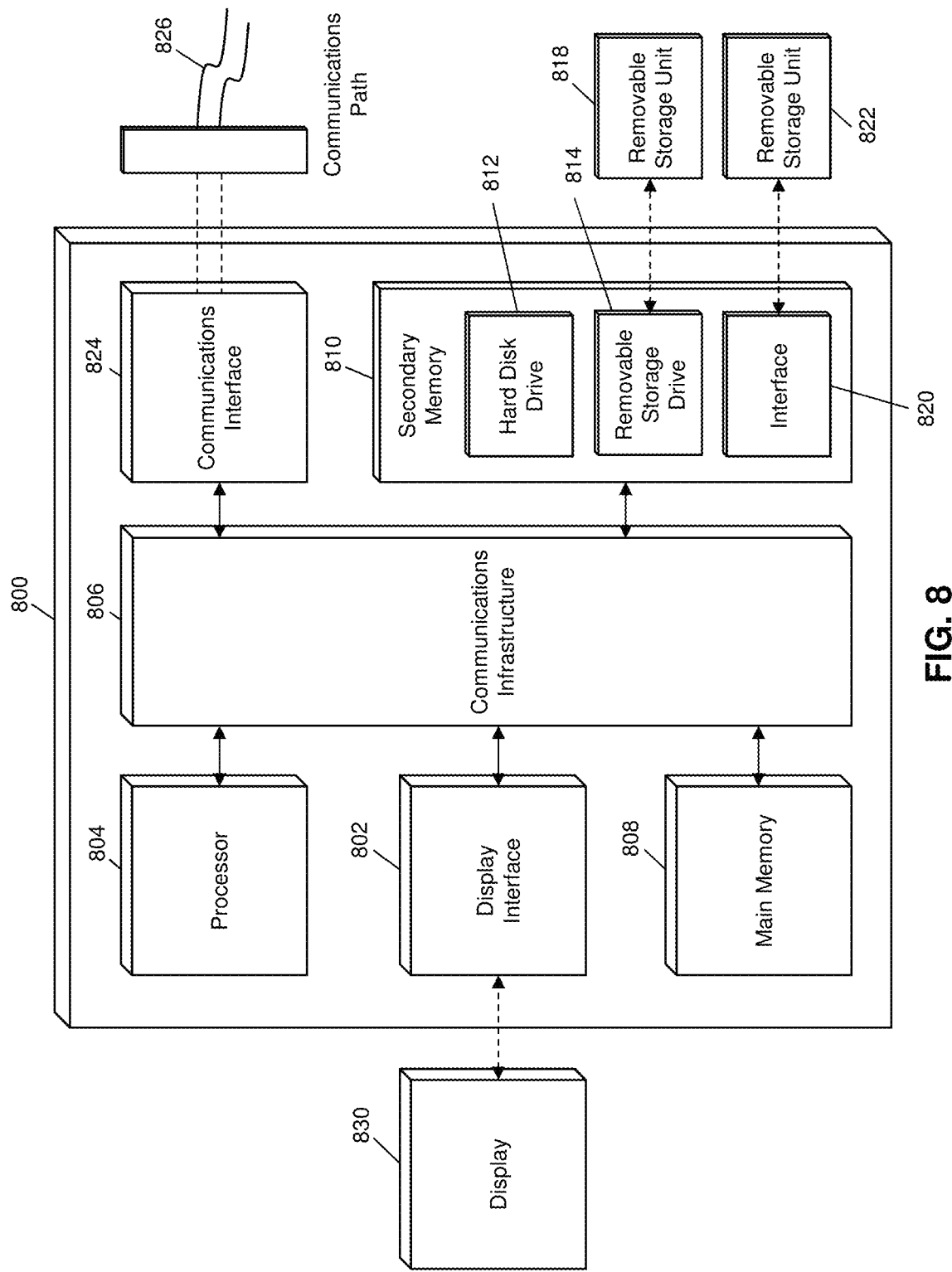
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device that has been specifically configured to perform the functions described herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for consumer verification of a payment transaction that exceeds previously established account limitations. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for consumer verification of a payment transaction that exceeds previously established account limitations, comprising:
    storing, in an account database of a processing server, a plurality of account profiles, wherein each account profile includes data related to a transaction account including at least a primary account number and one or more transaction controls;
    receiving, by a receiving device of the processing server, from a point of sale device of a merchant, a transaction message related to a payment transaction via a payment network, wherein the transaction message is formatted based on one or more standards and includes a plurality of data elements including at least (i) a first data element storing a specific primary account number, (ii) a second data element storing a point of sale identifier that identifies the point of sale device of the merchant, and (iii) one or more additional data elements storing transaction details including at least details of a particular product and/or service;
    executing, by a processing device of the processing server, a query on the account database to identify a specific account profile where the included primary account number corresponds to the specific primary account number stored in the first data element included in the received transaction message;
    determining, by the processing device of the processing server, whether the payment transaction exceeds the one or more transaction controls included in the identified specific account profile based on the transaction details stored in the one or more additional data elements included in the received transaction message;
    in response to determining that the payment transaction exceeds the one or more transaction controls, generating, by the processing server, a unique payment transaction identifier;
    electronically transmitting, by a transmitting device of the processing server, to the point of sale device of the merchant, a data signal comprising the generated unique payment transaction identifier with question data for a plurality of questions associated with the payment transaction,
        wherein the point of sale device is associated with the point of sale identifier stored in the second data element included in the received transaction message, and
        wherein at least one question of the plurality of questions requires input of a reason for exceeding a specific transaction control, of the one or more transaction controls, for purchasing the particular product and/or service;
    receiving, by the receiving device of the processing server, a data signal comprising the generated unique payment transaction identifier with answer data for a plurality of answers from the point of sale device of the merchant via the communication network;
    determining, by the processing device of the processing server whether the answer data for the plurality of answers included in the received data signal indicates valid answers or invalid answers to the plurality of questions;
    in response to determining that the answer data indicates valid answers, electronically transmitting, by the transmitting device of the processing server, the received transaction message to an issuing financial institution associated with the transaction account for processing of the transaction; and
    in response to determining that the answer data indicates invalid answers, declining, by the processing device of the processing server, the received transaction message, and transmitting the declined transaction message to the point of sale device of the merchant.

2. The method of claim 1, wherein
    the transaction message is received, by the processing server, from the point of sale device of the merchant, via an acquiring financial institution associated with the merchant involved in the payment transaction.

3. The method of claim 1, wherein the question data for the plurality of questions is based on at least the transaction details stored in the one or more additional data elements included in the received transaction message.

4. The method of claim 1, wherein
    each account profile of the plurality of account profiles further includes question data and answer data, and
    the question data for the plurality of questions corresponds to the question data stored in the identified specific account profile.

5. The method of claim 4, further comprising:
    authenticating, by the processing device of the processing server, the answer data for the plurality of answers based on the answer data included in the identified specific account profile.

6. The method of claim 1, further comprising:
    storing, in a question database of the processing server, a plurality of question data entries, wherein each question data entry includes data related to a question including at least question data and answer data, wherein
    each account profile of the plurality of account profiles further includes data indicating a plurality of question data entries, and
    the question data for the plurality of questions comprises question data included in the plurality of question data entries indicated in the identified specific account profile.

7. The method of claim 1, wherein
each account profile of the plurality of account profiles further includes transaction history, the transaction history indicating at least a reward date, and
one of the one or more additional data elements is configured to store a transaction date.

8. The method of claim 7, further comprising:
determining, by the processing device of the processing server, a time period between the transaction date included in the received transaction message and the reward date indicated in the transaction history included in the identified specific account profile exceeds a predetermined period of time.

9. The method of claim 8, wherein
the transaction message is received from the point of sale device of the merchant, via an acquiring financial institution associated with the merchant involved in the payment transaction, and
the received transaction message is transmitted to an issuing financial institution associated with the transaction account related to the identified specific account profile.

10. A system for consumer verification of a payment transaction that exceeds previously established account limitations, comprising:
an account database of a processing server configured to store a plurality of account profiles, wherein each account profile includes data related to a transaction account including at least a primary account number and one or more transaction controls;
a receiving device of the processing server configured to receive a transaction message related to a payment transaction, from a point of sale device of a merchant, via a payment network, wherein the transaction message is formatted based on one or more standards and includes a plurality of data elements including at least (i) a first data element storing a specific primary account number, (ii) a second data element storing a point of sale identifier that identifies the point of sale device of the merchant, and (iii) one or more additional data elements storing transaction details including at least details of a particular product and/or service;
a processing device of the processing server configured to
execute a query on the account database to identify a specific account profile where the included primary account number corresponds to the specific primary account number stored in the first data element included in the received transaction message,
determine whether the payment transaction exceeds the one or more transaction controls included in the identified specific account profile based on the transaction details stored in the one or more additional data elements included in the received transaction message, and
in response to determining that the payment transaction exceeds the one or more transaction controls, generating a unique payment transaction identifier; and
a transmitting device of the processing server configured to, electronically transmit, to the point of sale device of the merchant, a data signal comprising the generated unique payment transaction identifier with question data for a plurality of questions associated with the payment transaction, wherein
the point of sale device is associated with the point of sale identifier stored in the second data element included in the received transaction message,
at least one question of the plurality of questions requires input of a reason for exceeding a specific transaction control, of the one or more transaction controls, for purchasing the particular product and/or service,
the receiving device of the processing server is further configured to receive a data signal comprising the generated unique payment transaction identifier with answer data for a plurality of answers from the point of sale device of the merchant via the communication network,
the processing device is further configured to determine whether the answer data for the plurality of answers included in the received data signal indicates valid answers or invalid answers to the plurality of questions,
the transmitting device of the processing server is further configured to, in response to the processing device determining that the answer data indicates valid answers, electronically transmit the received transaction message to an issuing financial institution associated with the transaction account for processing of the transaction, and
in response to determining that the answer data indicates invalid answers, the processing device is further configured to decline the received transaction message and the transmitting device transmits the transaction message to the point of sale device of the merchant.

11. The system of claim 10, wherein
the transaction message is received from the point of sale device of the merchant via an acquiring financial institution associated with the merchant involved in the payment transaction.

12. The system of claim 10, wherein the question data for the plurality of questions is based on at least the transaction details stored in the one or more additional data elements included in the received transaction message.

13. The system of claim 10, wherein
each account profile of the plurality of account profiles further includes question data and answer data, and
the question data for the plurality of questions corresponds to the question data stored in the identified specific account profile.

14. The system of claim 13, wherein the processing device of the processing server is further configured to authenticate the answer data for the plurality of answers based on the answer data included in the identified specific account profile.

15. The system of claim 10, further comprising:
a question database of the processing server configured to store a plurality of question data entries, wherein each question data entry includes data related to a question including at least question data and answer data, wherein
each account profile of the plurality of account profiles further includes data indicating a plurality of question data entries, and
the question data for the plurality of questions comprises question data included in the plurality of question data entries indicated in the identified specific account profile.

16. The system of claim 10, wherein
each account profile of the plurality of account profiles further includes transaction history, the transaction history indicating at least a reward date, and one of the one or more additional data elements is configured to store a transaction date.

17. The system of claim 16, wherein the processing device of the processing server is further configured to determine a time period between the transaction date included in the received transaction message and the reward date indicated in the transaction history included in the identified specific account profile exceeds a predetermined period of time.

18. The system of claim 17, wherein
- the transaction message is received from the point of sale device of the merchant via an acquiring financial institution associated with the merchant involved in the payment transaction, and
- the received transaction message is transmitted to an issuing financial institution associated with the transaction account related to the identified specific account profile.

\* \* \* \* \*